F. D. WILLIAMS

June 18, 1929. METHOD OF MOTION PICTURE COMPOSITION Re. 17,330

Original Filed March 8, 1924

INVENTOR.
Frank D. Williams
BY Westall and Wallace
ATTORNEYS

Reissued June 18, 1929. Re. 17,330

UNITED STATES PATENT OFFICE.

FRANK D. WILLIAMS, OF LOS ANGELES, CALIFORNIA, ASSIGNOR, BY MESNE ASSIGNMENTS, TO PATENTS PROCESS INCORPORATED, OF LOS ANGELES, CALIFORNIA.

METHOD OF MOTION-PICTURE COMPOSITION.

Original No. 1,589,731, dated June 22, 1926, Serial No. 697,739, filed March 8, 1924. Renewed November 9, 1920. Application for reissue filed March 28, 1927. Serial No. 179,168.

This invention relates to the art of producing composite pictures wherein a real setting or scene in which action may take place is incorporated with an artificial picture or drawing.

As an illustration of an application of this invention, it is often desired to produce a picture wherein the action takes place in a room having a ceiling. With my invention, the picture may be photographed by employing a set having no ceiling. This photograph may then be associated with an artificial scene showing the ceiling to form a complete composite photograph.

An object of this invention is to provide a method whereby the component parts of a picture may be properly registered to produce a unitary picture and whereby the tones, perspectives and other qualities may be blended so that no lines of demarcation between the parts will be apparent.

Figure 1:
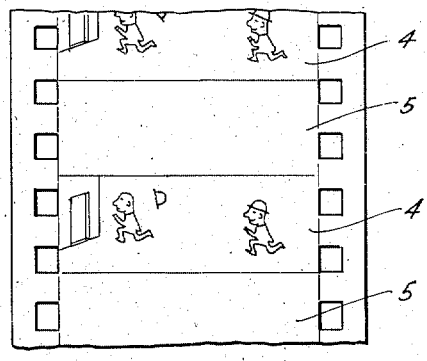
Figure 2:
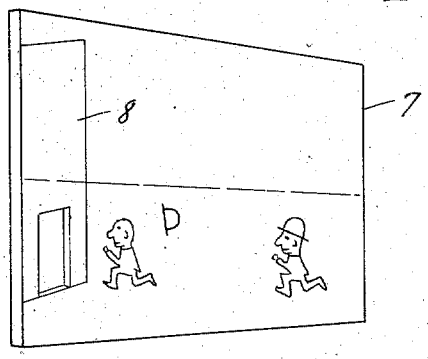
Figure 2:
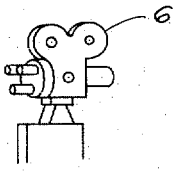
Figure 3:
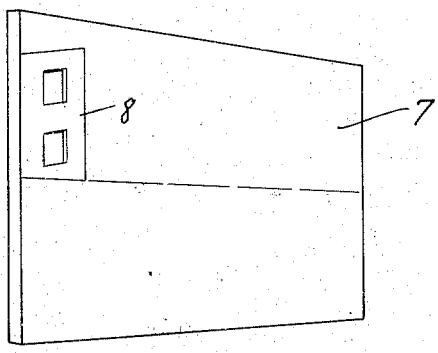
Figure 3:
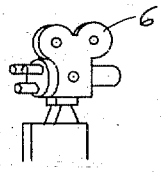

In the accompanying drawing, certain apparatus is shown illustrative of the steps followed in making a picture as outlined herein, in which:

Fig. 1 is a view showing a positive film containing the component of a photograph wherein the action is taking place; Fig. 2 is a perspective view of apparatus for projecting the photograph shown in Fig. 1 preliminary to artificially producing the other component; and Fig. 3 is a perspective view of the apparatus shown in Fig. 2, with the artificial component completed and ready for photographing upon a film.

The specific picture which is herein described as being produced has been selected merely for the purpose of illustrating the invention in a simplified form. The picture consists of an action wherein one man pursues another through the doorway of a building. The building to be shown is one of several stories, but the action can best be produced in the foreground of a set having only the lower part of the building. The upper part of the building will be supplied by a drawing or picture.

In accordance with the invention, the action and set are photographed with the upper part of each frame masked. A positive of one take or frame is made and appears as shown in Fig. 1, wherein the photographed portion is indicated by 4 and the masked portion by 5. The masked portion shows in the positive as a transparent field. By my improved process the positive is projected from the camera 6 located in a definite position upon a reflector screen 7, preferably a white screen. While so projected, the picture on the screen is completed in proper registration by outlining the upper portion of the building as indicated by 8. This step is illustrated in Fig. 2. The artificial supplemental part may now be completed by drawing in any of the details. This may be done while the picture is still being projected or after the outline has been drawn in. The depicted supplemental portion on the screen is in proper registration with respect to the component images for photographing it upon a film.

There are a number of optional methods of procedure from this point. However, I prefer to proceed in the following manner: A positive of the artificial component is made and the lower portion of each of the frames covered with an opaque coating. This may be done at the time the artificial component is photographed by coating the lower portion of the screen below the line of demarcation with a light nonreflective material as by blackening the screen. Thereupon the screen may be photographed by a camera in the same location as before and a positive made thereof. This positive has only the artificial picture thereof, the lower portion thereof being in effect masked. A positive of the real component has the masked portion correspondingly covered with an opaque coating. A composite negative may now be made by printing onto a sensitized film first from one positive and then from the other.

Another method consists in placing the positive of the real component over a sensitized film, the upper portion of the positive being left in its transparent condition. An exposure is made as illustrated in Fig. 3. The artificial component is photographed upon the sensitized film, while the animate or real component is printed through the positive by reason of the reflection of the light from the screen. Still another variation consists in photographing the artificial component with the lower portion of the sensitized film masked. Negatives could then be made of the real and artificial components and double printing resorted to for obtaining the final picture.

The steps may also be reversed. For illustration, a still photograph of a background may be used for making a component of the ultimate picture. This component may be photographed upon a moving picture film, a portion thereof being masked. A positive is now made and a perspective projection is made upon a stage to locate parts of the set which are to be used for the objective of the other component. This permits accurate registration. The set is built and action therein photographed, masking the portion of the film corresponding to the other component. The remaining steps are obvious. It is obvious that the steps may be carried out by employing negatives instead of positives. The term "positive" is used broadly in the claims to include negatives.

What I claim is:—

1. The herein described method of making pictures, which consists in making a positive of a real component portion of a selected scene having only part of the desired background, projecting said positive through a lens upon a screen, completing the projected picture by drawing on said screen an artificial supplemental portion of the background to register and blend with the projected real component portion, photographing said supplemental portion, and making a composite print of the real and artificial photographs.

2. The herein described method of making pictures, which consists in masking a portion of a sensitized film, photographing on the exposed surface a real component portion of a selected scene having only part of the desired background, making a positive therefrom, projecting said positive through a lens upon a screen, completing the projected picture by drawing on said screen an artificial supplemental portion of the background to register and blend with the projected real component portion, photographing said artificial supplemental portion, and making a positive print of the real and artificial photographs.

3. The herein described method of making pictures consisting of making a positive of a real component portion of a selected scene having only part of the desired background, projecting said positive through a lens upon a screen, completing the projected picture by drawing on said screen an artificial supplemental portion of the background to register and blend with the projected real component portion, photographing said artificial supplemental portion, making a positive therefrom with the area of the real component portion opaque, making a positive of the real component portion with the area of the artificial supplemental portion opaque, and making a negative from said positives on a single film by first printing one positive and then printing the other positive thereon.

4. The herein described method of making pictures, which consists in masking a portion of a sensitized film, photographing on the exposed surface a real component portion of a selected scene having only part of the desired background, making a positive therefrom, projecting said positive through a lens upon a screen, completing the projected picture by drawing on said screen the remaining supplemental portion of the background to register and blend with the projected real component portion, photographing said artificial supplemental portion, making a positive therefrom with the area of the real component portion opaque, making a positive of the real component portion with the area of the artificial supplemental portion opaque, and making a negative from said positive on a single film by first printing one positive thereon, and then printing the other positive thereon.

5. The herein described method of making motion pictures which consists in making a set of photographic pictures of a component portion of a selected scene, projecting one member of the set of such photographic pictures upon a screen, completing a composite picture image by creating a supplemental portion on said screen so as to register and blend with the projected component, separately photographing said supplemental portion upon a film to produce a multiplicity of photographic pictures so as to be disposed thereon in complementary registered relation to the component photographic pictures, light impressing a single sensitized film with both the sets of component pictures and the supplementary pictures in complementary registered relation, and developing said sensitized film.

6. The herein described method of making motion pictures which consists in making a set of photographic pictures of a component portion of a selected scene, projecting from a selected location one member of the set of such photographic pictures upon a screen maintained in definite position with respect to said location, completing a composite image by creating a supplemental portion on said screen so as to register with the projected component, separately photographing from said definite position the supplemental portion depicted on said screen to produce a multiplicity of photographic pictures upon a film disposed thereon in complementary registered relation to the component photographic pictures, and light impressing a single sensitized film with both the set of component pictures and the supplementary pictures in complementary registered relation, and developing said sensitized film.

7. The herein described method of making motion pictures which consists in making a set of photographic pictures of a component portion of a selected scene, projecting one member of the set of such photographic pictures upon a visual image receptive medium to produce component images, completing a composite picture image by creating a supplemental portion so as to register and blend with the projected component, and separately photographing said supplemental portion upon a film to produce a multiplicity of photographic pictures so as to be disposed thereon in corresponding registered relation to the component photographic pictures, light impressing a single sensitized film with both the sets of component pictures and the supplementary pictures in complementary registered relation, and developing said sensitized film.

8. The herein described method of making motion pictures, which consists in masking a portion of a sensitized film, photographing on the exposed surface a real component portion of a selected scene having only part of the desired background, making a transparency therefrom, projecting the image on said transparency upon a screen, completing the projected picture by creating on said screen an artificial supplemental portion of the background to register and blend with the projected real component portion, and producing on a single film a composite picture of the real and artificial components in complementary relation including in the production photographing said artificial supplemental portion.

9. The herein described method of making motion pictures which consists in photographing on a sensitized film a set of partial pictures of a scene, making a projectable picture of one member of said set, projecting said projectable picture on a visual receptive medium to produce a component image, completing a composite picture on said medium by creating thereon an artificial supplemental portion of the scene so as to register and blend with the projected component, and producing by aid of said artificial portion a light impressed composite picture of said component and supplemental portion in complementary relation including in the production photographing said artificial supplemental portion.

In testimony whereof I have hereunto signed my name this 25th day of February, 1927.

FRANK D. WILLIAMS.